United States Patent [19]

Chiang et al.

[11] Patent Number: 4,469,995
[45] Date of Patent: Sep. 4, 1984

[54] METHOD OF STOPPING A STEPPING MOTOR

[75] Inventors: David Chiang, Dix Hills; Mosi Chu, Setauket; Solomon Manber, Sands Point, all of N.Y.

[73] Assignee: MCC Associates, Short Hills, N.J.

[21] Appl. No.: 399,207

[22] Filed: Jul. 19, 1982

[51] Int. Cl.³ .......................................... H02K 29/04
[52] U.S. Cl. .................................... 318/685; 318/696
[58] Field of Search ....................... 318/254, 685, 696

[56] References Cited

U.S. PATENT DOCUMENTS

| | | | |
|---|---|---|---|
| 3,628,119 | 12/1971 | Abraham et al. | 318/685 |
| 3,636,429 | 1/1972 | Jakubowski et al. | 318/685 |
| 3,863,118 | 1/1975 | Lander et al. | 318/685 |
| 4,320,330 | 3/1982 | Bahr et al. | 318/685 |

OTHER PUBLICATIONS

D. W. Kennedy, "Digital Methods Fixes Phase Lag or Lead" Control Engineering, Aug. 1967, p. 72.

Primary Examiner—J. V. Truhe
Assistant Examiner—Saul M. Bergmann
Attorney, Agent, or Firm—Roberts Spiecens & Cohen

[57] ABSTRACT

A method of stopping a feedback-controlled stepping motor having a stator and a rotor wherein the drive of the stator field is leading the rotor by more than one step and the rotor is rotating with an angular velocity within a first range of values is performed by decreasing the drive lead of the stator field from its slewing value to another value whereby the angular velocity of the rotor decreases below the first range and sensing for the decrease of the angular velocity of the rotor to within a second range of values so that when the angular velocity of the rotor is within the second range of values the rotation of the stator field is stopped to brake the rotor.

16 Claims, 4 Drawing Figures

POSITIONING SYSTEM

POSITIONING SYSTEM

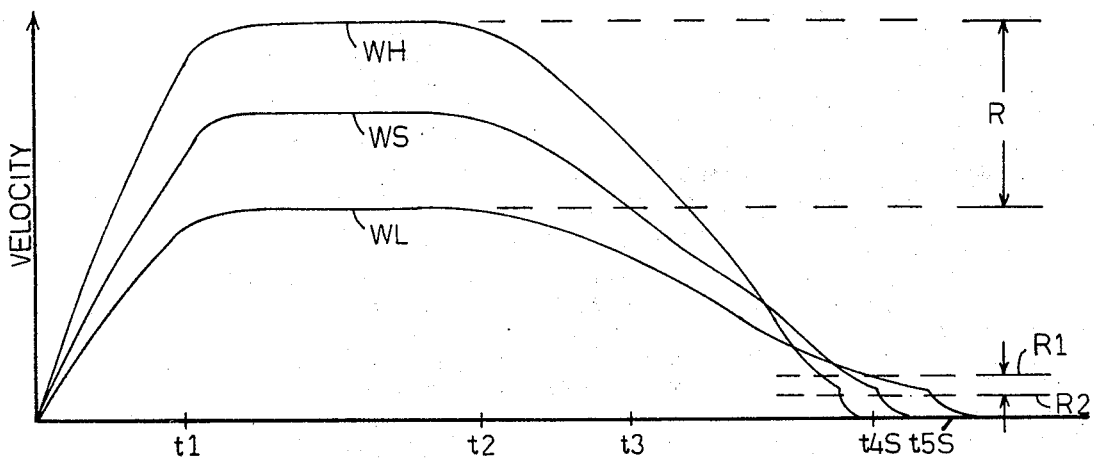
FIG. 2
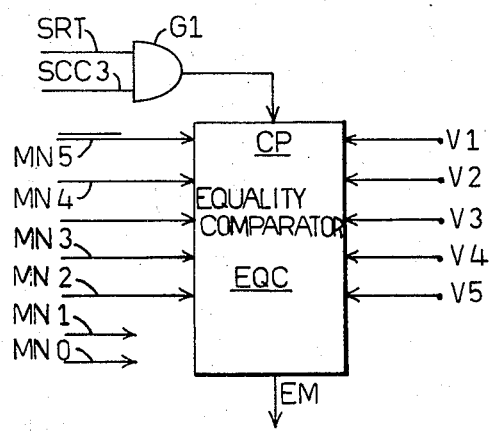
WINDOW DETECTOR WD
FIG. 3
FIG. 4 CONTROLLED PULSE INJECTOR CPI
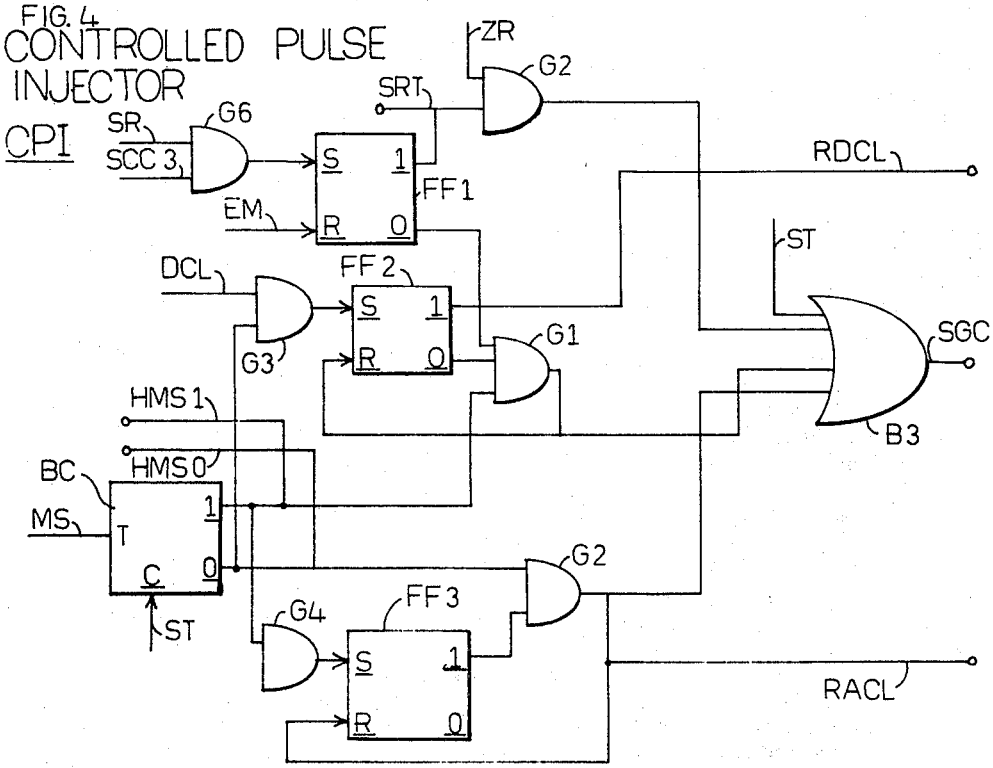

METHOD OF STOPPING A STEPPING MOTOR

BACKGROUND OF THE INVENTION

This invention pertains to stepping motors and, more particularly, to methods of stopping stepping motors to minimize oscillations.

In many applications utilizing stepping motors, it is quite often necessary to rapidly and precisely stop the motor. A particular example is when the motor drives a printing head via a lead screw. While the drive is being performed, the rotor and the load coupled thereto possess considerable kinetic energy. Since the field generated by the stator windings is elastically coupled to the rotor, any rapid stopping of the rotation of the stator field results in the oscillation of the rotor and load about a rest position. This oscillation continues until the kinetic energy is expended—generally by friction within the system. Since a properly designed system minimizes friction, the oscillation can continue for a considerable time. If this oscillation is of any magnitude, then the stopping cannot be considered as occurring until the oscillation falls below a certain minimum value. In order to minimize such oscillations upon stoppping, there have been proposed controlled stopping routines for the the motor. Various stepping methods have been proposed. For example, there is a lengthy discussion in the article entitled "Control Aspects of Step Motors" by B. C. Kuo and R. A. Yackel pp. B-1 to B-23 (See especially text starting at line 3 from bottom of right-hand column of page B-21 to end of text) of *PROCEEDINGS, SECOND ANNUAL SYMPOSIUM MOTION CONTROL SYSTEMS AND DEVICES,* 1973 University of Illinois, Urbana-Champaign. Another such routine is discussed in "Dynamic Performance of a Three-Phase Variable-Reluctance Motor" by J. P. Pawletho and H. D. Chai, Pp. 1–6, of *PROCEEDINGS SEVENTH ANNUAL SYMPOSIUM INCREMENTAL MOTOR CONTROL SYSTEMS AND DEVICES* 1978, University of Illinois, Urbana-Champaign.

In the system disclosed in the second article, the acceleration and deceleration are regulated by controlling the phasing of the energization. In particular, during deceleration the driving pulses for stepping the motor are delayed in phase by a fixed amount. Furthermore, there is a programmed fixed number of such injected pulses. At the end of these injected pulses, another pulse is injected whose delay is also a programmed amount. Such a system works well for the drive of a constant known load such as the daisy wheel of a printer. However, when the load varies and when the tolerances imposed on the driving mechanism are reduced so as to reduce cost, such a routine cannot be used because for each different load or for each different motor there will be a different number of deceleration pulses as well as a different delay for the last pulse.

There is also described in Sec 11.3, entitled Description of the Variable-Unit Time-Delay Speed Control Systems, of *STEP MOTORS AND CONTROL SYSTEMS,* edited by Benjamin C. Kuo and published by SRL Publishing Company, Champaign, Ill. in 1979 a variable control system which controls the timing of the stepping pulses as a function of the difference between a desired velocity and the instantaneous velocity of rotation of the motor. Such control is an improvement of the system of the second article. However, when very precise control of the velocity to within a very narrow range before braking is desired to insure a precise stopping position other refinements must be employed.

SUMMARY OF THE INVENTION

It is accordingly a general object of the invention to provide a method for stopping a stepping motor which is coupled to a varying load or which has torque and/or inertia specifications that can vary by a considerable amount.

It is another object of the invention to provide such refinements.

Briefly, the invention contemplates stopping a stepping motor having a stator and a rotor wherein the excitation of stator field is leading the rotor by more than one step and the rotor is rotating with an angular velocity within a first range of values. The stopping is accomplished by decreasing the drive lead of the stator field from its slewing value to a lesser value whereby the angular velocity of the rotor decreases to a value below those in the first range. The decreasing of the angular velocity of the rotor is sensed to within a second range of values. During this deceleration of the rotor the deceleration force is varied as a function of the difference between the actual angular velocity and a changing desired angular velocity. When the angular velocity of the rotor is within this second range of values, the rotation of the stator field is differently controlled to also stop the rotor with minimum oscillations.

BRIEF DESCRIPTION OF THE DRAWING

Other objects, the features and advantages of the invention wil be apparent from the following detailed description when read with the accompanying drawing which shows a system for practicing the invention. IN THE DRAWINGS:

FIG. 2 is a set of waveforms showing velocity as a function of time for explaining the invention;

FIG. 3 is a logic diagram of the window detector of FIG. 1; and

FIG. 4 is a logic diagram of the controlled pulse injector of FIG. 1.

DETAILED DESCRIPTION OF PREFERRED EMBODIMENTS

Figure 1:
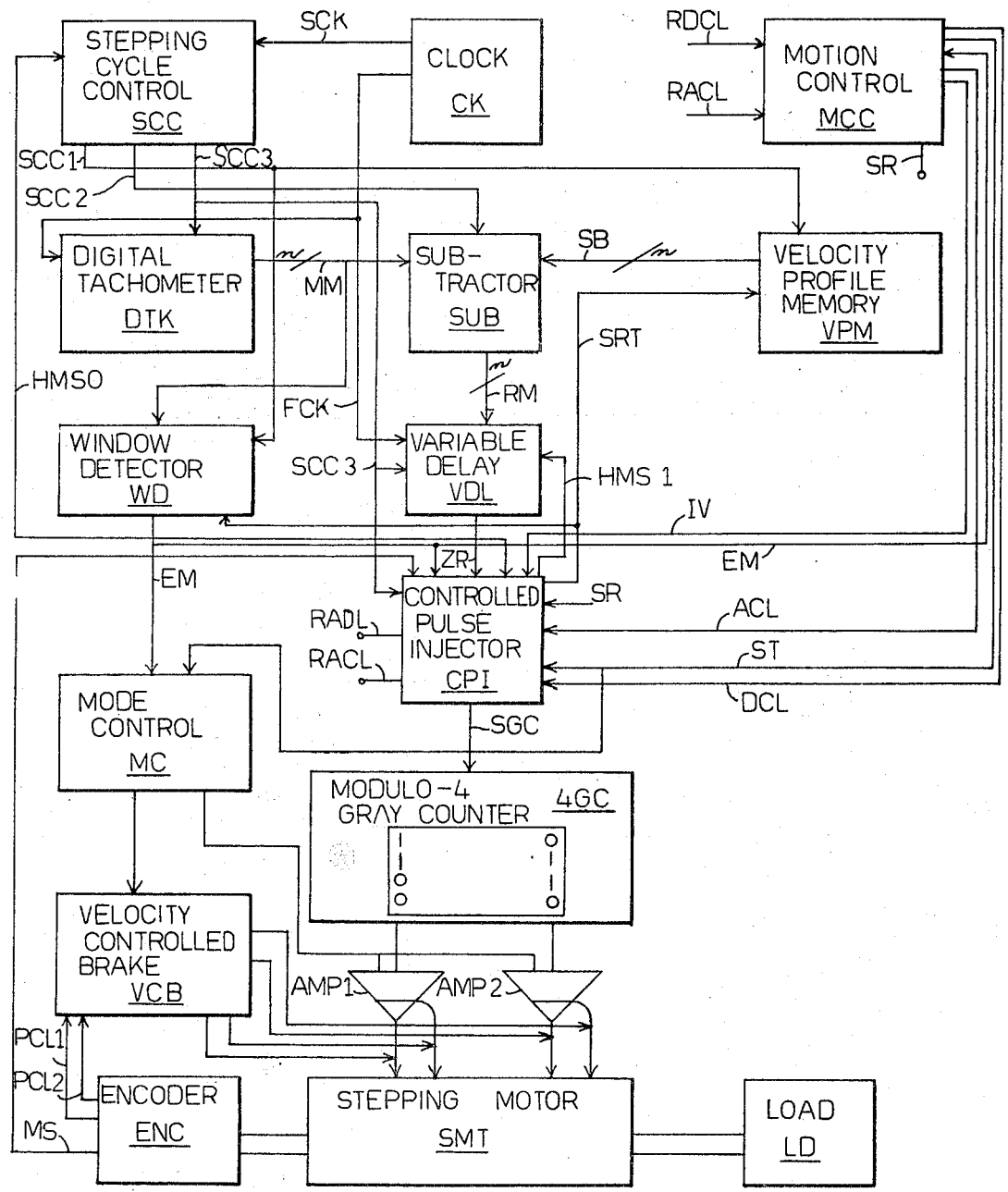
FIG. 1 shows a block diagram of a system utilizing the method of the invention.

Before discussing the apparatus of the invention, the basic theory of operation will be given. In stepping the stepping motor there are essentially two parts. During the first the motor is decelerated within a shortest fixed distance from a wide range of slewing speeds to a terminal speed which is within a narrow range. During the second part the "reverse brake" or equivalent is applied such that the residual oscillation will be minimal even though the terminal speed of the rotor varies on a narrow range.

In FIG. 1 there is shown a stepping motor SMT connected to a load LD and a shaft encoder ENC. The motor SMT is driven in a stepwise manner by injected signals from drive amplifiers AMP1 and AMP2. These injected pulses are effectively derived from pulses generated by the shaft encoder ENC through the intermediate circuitry. If the motor SMT is a standard motor, i.e., its torque and inertia characteristics fall within a certain tolerance range, and if the load LD is a normal load, i.e., the load again is in the middle of a range of conceivable loads, then the waveform WS of FIG. 2 shows the velocity profile of the motor from an initial rest to a maximum velocity to a controlled stop. In view of these assumptions, the motor is initially accelerated between a time zero and a time t1 by increasing the lead angle of the stator field with respect to the rotor. At the time t1 a terminal velocity for this motor for a given lead angle is reached. From the time t1 to the time t2, the motor is in the slewing phase. At the time t2, it is decided to start braking the motor for a stop. The braking is initiated by first decreasing the lead angle of the stator field. The rotor starts decelerating and during this deceleration its angular velocity is monitored. At a time t4S, the angular velocity is sufficiently slow so that any braking will result in minimum oscillations. Therefore, at that time the pulsing or stepping of the stator field goes into a final braking phase and the rotor rapidly reaches zero velocity with very slight oscillations so that the rotor stops at a very definite position. If, on the one hand, the torque of the motor were higher than the standard and/or the frictional load were lesser than the standard, then the velocity profile of the rotor would follow the waveform WH. On the other hand, if the torque were lower and/or the frictional load greater, then the motor would follow the curve WL.

In a normal distribution of motors and loads, the velocity profile would fall between the waveforms WL and WH. However, regardless of the waveform, it should be carefully noted that after the deceleration starts there is accompanied therewith either immediately or sometime thereafter the monitoring of the angular velocity of the rotor and control of the stator field until the rotor velocity falls within a range of velocity delineated by the reference numerals R1 and R2. When the angular velocity is within this range, the actual stopping of the rotation of the stator field is performed.

According to one feature of the invention, during the deceleration range between time t2 and t4, the actual angular velocity of the rotor is compared against the theoretical standard angular velocity of a standard rotor. The results of these comparisons determine when the stator field is to be retarded to insure a controlled deceleration towards the stopping range. The actual comparisons can be performed starting with the initiation of the deceleration, but such starting time requires very high-speed electronics. However, to use slower speed electronics it is desirable to delay the comparisons to a time t3 wherein the electronics can handle reasonable counting speeds. Furthermore, if the system is programmed within a microprocessor such delay would be needed due to the slow response times of the microprocessor in processing the incoming data.

Although many systems using various types of stepping motors can advantageously exploit the invention, the system shown in FIG. 1 is disclosed to simplify the description of the invention. The stepping motor SMT can be a two-phase bifilar wound motor. Its output shaft is connected to a load LD such as a lead screw and nut combination. In addition, the shaft of motor SMT is connected to a shaft encoder ENC. The shaft encoder ENC can be of the type which includes an opaque disk having a plurality of radially extending slots about a first track. These slots are uniformly disposed about the disk and there can be two slots per step of the rotor of motor SMT. Straddling the disk in the region of the slots can be a light-emitting diode and a photocell. The diode and the cell are so aligned that the light from the diode will pass through a slot to the photocell. Thus, as the shaft rotates the shaft encoder sends pulse signals onto the line MS.

The remainder of the system is concerned with controlling the stepping of the motor. The motion control MCC effectively initiates the movement of the motor, its acceleration to a slewing mode and the start of deceleration, i.e., the motion control MCC is generally operative at times t0, t1 and t2. If there is to be a delay before the comparisons take place, then the motion control MCC initiates the start of comparisons at time t3. The remainder of the system controls the generation of stepping pulses.

The drive of the motor will be by amplifiers AMP1 and AMP2 in response to signals from gray counter 4GC. Since, by way of example, the drive will be a bipolar two-phase drive, the gray counter will be a modular-four counter, i.e., it will emit voltage levels corresponding to the table shown within the counter. The gray counter 4GC is stepped by pulses received from controlled pulse injector CPI via line SGC.

The digital tachometer DTK measures the time between successive pulses from the encoder ENC. In particular, it counts the number of fast clock pulses on line FCK from the clock CK. Thus, the count of the pulses between two of the encoder pulses is a representation of the instantaneous velocity of the rotor. The window detector WD receives the counts from the digital tachometer DTK. When the count is within the predetermined range, the window detector WD will emit a pulse on line EM. The window detector WD and the control pulse injector CPI will be described more fully hereinafter.

The velocity profile memory VPM can be a read-only memory which is sequentially addressable. In each of the sequential registers is a number representing a standard velocity. In effect, stored in the memory VPM are a series of values of velocity associated with the curve WS between the times t3 and t4. (More particularly each number represents a value such that when such number is subtracted from the actual velocity number the remainder number will be associated with a lead angle which would tend to urge the rotor velocity at that time toward the standard velocity.) The selected number is fed to one input of a subtractor SUB whose other input receives a number representing the instantaneous velocity from the tachometer DTK. The subtractor SUB is a conventional subtractor which transmits a remainder on the cable RM to the variable delay VDL. The delay VDL can be a down counter which, after being loaded with a number from the subtractor SUB, downcounts fast clock pulses received on line FCK. When the count reaches a value of zero, the counter emits a pulse on line ZR to the controlled pulse injector CPI.

The clock CK emits two series of clock pulses, fast clock pulses emitted on line FCK to operate as timing pulses and slower clock pulses on line SCK to operate as stepping pulses for a stepping cycle counter SCC. This counter can be a step counter which upon receipt of a pulse on line HMSO (basically every other pulse on line MS) is stepped forward for each pulse received on line CK to sequentially emit pulses on line SCC1 and SCC2 and SCC3. After the emission of the pulse on line SCC3, the counter stops until being reinitiated by another pulse on the line HMSO.

The operation of the system will now be descibed by making reference to FIG. 1:

At the start of operation, the step motor is in a detent position wherein effectively the stator field and the rotor have a minimum phase difference. To start the motor, the motion control MCC emits a single pulse on the line ST to the controlled pulse injector CPI which passes this pulse via the line SGC to the gray counter 4GC. The gray counter changes its count and consequently the drive currents to the stepping motor SMT. In effect, the stator field is moved a full step ahead of the rotor. At the same time as the pulse on the line ST the motion control MCC feeds a signal on line ACL to the controlled pulse injector CPI. The rotor starts rotating and after half a step the encoder ENC feeds a pulse on line MS to the controlled pulse injector CPI which increments the counter 4GC. Thus, the stator field will now lead by a step and a half. In addition controlled pulse injector CPI sends a signal back on line RACL indicating the stepping has occurred. In response thereto the control MCC terminates. At this time, optimum torque is being applied to the motor for the particular total rotation and the motor speeds up to a terminal velocity which occurs around the time t1. If there will be a longer rotation time for the rotor then it is desirable to increase the lead angle again after the first plateau of terminal velocity. This is accomplished in the same manner as above, i.e., motion control MCC emits another pulse on line ACL and the lead angle will go to two and one-half steps driving the rotor to a second and higher plateau of terminal velocity.

After this, the lead is maintained merely by passing through every other pulse from the encoder ENC through the controlled pulse injector CPI to the gray counter 4GC. It should be noted that during slewing the count in the gray counter is changed for every other pulse from the encoder ENC. It is during acceleration that two successive pulses are passed through and, as will hereinafter become apparent, during initial deceleration two successive pulses will not be passed through.

When deceleration is desired, the motion control MCC feeds a signal on line DCL to the controlled pulse injector CPI. The pulse from the encoder ENC which should be passed through is blocked and not passed through the injector CPI and the lead angle decreases by a step. The injector CPI returns a signal on line RDCL to control MCC indicating the decrease in the lead angle. If the lead angle were one and one-half steps it would now drop to about a half a step. If the lead angle were two and a half steps it would drop to one and a half and after a settling period another DCL signal would be fed from motion control MCC. The motor starts decelerating and at a time t3 (see FIG. 2) the motion control MCC emits a signal on the line SR to the control pulse injector CPI. The control pulse injector CPI, in response thereto, emits a timed pulse on the line SRT to initialize the velocity profile memory VPM and alert the window detector WD. When the next pulse from the encoder passes via line MS, controlled pulse injector CPI and line HMSO to the stepping cycle control SCC, the usual pulse on the line SCC1 is emitted to increment the address in the memory VPM to the first register and present the contents thereof at the output of the memory. When the pulse on the line SCC2 occurs, the subtractor is opened to receive the standard velocity value from the memory VPM and the instantaneous velocity member from the digital tachometer DTK on the cable MM. The subtraction is performed and the remainder is present on the lines of the cable RM. When the pulse occurs on the line SCC3, variable delay VDL accepts the remainder number on the lines of the cable RM. The next occurring signal on line HMS1 starts the downcounting by fast clock pulses received on the line FCK. At the same time, the digital tachometer is cleared and, again, starts counting. When the count in the variable delay reaches zero, a pulse is emitted through the controlled pulse injector CPI and the line SGC to increment the modulo-four gray counter 4GC. It should be noted that the greater the remainder, the greater the delay and, therefore, the smaller the lead angle. It should also be noted that greatest delays occur for the greatest difference between a representation of the standard velocity and the actual velocity. It also should be apparent from a subsequent reading of the description of the controlled pulse injector CPI that, in spite of the fact that the tachometer, subtractor and memory are constantly operating, they have no effect until the generation of the pulse on the line SRT.

When the velocity of the rotor as represented by a number in the digital tachometer DTK falls within a specified range or window, the window detector WD emits a pulse on the line EM which disables the controlled pulse injector CPI to stop the feeding of any pulses to the counter 4GC and, thus, the motor is stopped. In addition, the pulse on the line EM is fed to the motion control MC to indicate that the motor has stopped and the desired movement accomplished.

What has been described is the simplest way of braking the rotor. There are other possible ways. One way is by using "bang-bang" techniques whereby the stator field is stepwise switched between two positions to induce counter forces on the direction of movement of the rotor. In this method it is possible to control the timing for the generation of the stepping pulses as a function of the instantaneous velocity of the rotor to rapidly squelch any possible oscillations.

In a preferred embodiment braking occurs by controlled positioning of the stator field with respect to the rotor position as well as the desired position. In such case the encoder is provided with a second track with another plurality of radially extending slots where there is one slot per step. In addition the mode control flip-flop MC and the velocity controlled brake VCB are added to the system. The velocity controlled brake is shown and described in detail in FIGS. 4 and 5 of our copending application Ser. No. 273,625, filed June 15, 1981.

At the start of the stepping operation the signal line ST fed to the set input of the flip-flap MC sets the mode control flip-flop MC whereby the amplifiers AMP1 and AMP2 are activated allowing the gray counter 4BC to control stepping of the motor. When the window detector WD emits the pulse on line EM fed to reset input of the flip-flap MC to initiate braking the mode control flip-flop MC activates the velocity controlled brake VCB and deactivates amplifiers AMP1 and AMP2. At this time, the motor is no longer actively driven. However, since it does not stop instantaneously but starts oscillating about this stopping position. Thus a sinusoidal signal is generated. This signal is zero crossing detected to provide two pulses per sinusoid. These pulses are fed via the lines PCL1 and PCL2, to the velocity controlled brake VCB. When the brake was energized there was activated a clock therein which starts controlling an analog to digital velocity value converter. This converter, in response to sequences of timing signals effectively samples two values of the signal from the encoder at a fixed time interval so that a velocity calculation can be made. In particular, each signal as it is received is converted to a digital value; then the pairs of digital values are subtracted. The resulting remainder digital value (with a sign bit) is fed into a function table and converted to a digital value representing the velocity. This digital value is fed to motor and driving circuits. The digital value sent thereto is a function of the velocity so that the stator field is now displaced in a direction opposite to the instantaneous oscillatory movement direction by an amount related to the actual rotor velocity so that there can be a braking of the rotor. As the shaft is still rotating, the encoder is continuously sampled and the braking displacements are changed as the velocity decreases. When the velocity gets below a certain amount, its amplitude is sensed by a zero sensor which emits a signal. At the same time, the clock pulses are counted such that, say for every 16 clock pulses a strobe signal is generated which samples the signal from the zero sensor. Whenever, say, four successive zeros have been counted, a counter will emit a pulse indicating that the oscillations have fallen below an allowed amount signifying that the rotor has effectively stopped.

There will now be described specific elements of the system.

The window detector WD (FIG. 3) can be a multiposition equality comparator which is alerted to operate by a signal at the output of AND-circuit G1 responsive to the simultaneous occurrence of signals on the lines SRT and SCC3. To establish a range instead of an exact value, an equality comparison is performed between the more significant bits of the output of the tachometer and a preset number of bits represented by the voltages V1 to V5. For example, assume that the output of the tachometer DTK is a 7-bit number. Then to establish a range, only the five most-significant bits are utilized. Therefore, whenever the number is within a range having four values, the comparator will emit a pulse on the line EM.

The controlled pulse injector CPI as shown in FIG. 4 performs two functions. First, it generates two interleaved trains of pulses on lines HMS0 and HMS1. The pulses on line HMS0 are actually the even pulses of the series of line MS and the pulses on line HMS1, the odd pulses. In a sense, the odd pulses are used to control the stepping of the gray counter 4GC and the even pulses to activate the stepping cycle control SCC. The second function of the injector CPI is in a sense to select which of three sources will supply the pulses to increment the gray counter 4GC. Thus, the OR-circuit B3 has four inputs; the first connected to the line ST which is used during the initial starting of the motion; the second is connected to the output of an AND-circuit G2 whose inputs are connected to the lines ZR and SRT. It will be recalled that the line ZR is connected to the output of the variable delay VDL. Thus, gray counter will be incremented by pulses from variable delay VDL during the times t3 to t4 of FIG. 2 when the signal on the line SRT is present. The line SRT is connected to the 1-output of the flip-flop FF1. The flip-flop FF1 is set effectively by a pulse at the output of AND-circuit G6. In particular, a pulse is emitted from this output during the coincidence of the signals on lines SR and SCC3 when a normally non-stepping pulse is being received.

The remainder of the circuitry concerns the stepping of the motor during acceleration, slewing and initial deceleration. During the slewing portion every other pulse on the line MS should increment the gray counter.

Thus, in a sense, the input of the gray counter receives a chain of alternate ones and zeros. This is accomplished by connecting the line MS to the toggle input of a single stage binary counter BC whose 1-output is connected via line HMS1 to one input of AND-circuit G1 whose output is connected to the OR-circuit B3. Another input of the AND-circuit G1 is connected to the zero-output of flip-flop FF1 to close the circuit during deceleration when the injected pulses are received by the variable delay VDL on line ZR. The third input to AND-circuit G1 is connected to the zero output of flip-flop FF2 to control the deletion of an injecting pulse during deceleration. Note the flip-flop FF2 is set by the coincidence of signals on line DCL and HMS0 at the inputs of AND-circuit G3. The one-output of the flip-flop is connected to line RDCL. The flip-flop is reset by the trailing edge of a pulse of the output of AND-circuit G1.

During forced acceleration, a sequence of ones will be fed to the gray counter 4GC. This is accomplished by feeding one of the HMS0 pulses to OR-circuit B3. This is accomplished by AND-circuit G2 having one input connected to line HMS0 and another input connected to the one-output of flip-flop FF3. The flip-flop FF3 is set by the coincidence of signals on lines ACL and HMS1 fed to inputs of AND-circuit G4. The flip-flop is reset by the trailing edge of a pulse at the output of AND-circuit G2 which also pulses line RACL.

There has just been shown apparatus for performing the invention. While hardware has been shown to perform the method, it is equally possible for a microprocessor to be programmed to assume the roles of the circuits for driving the amplifiers AMP1 and AMP2. However, it should be realized that using a microprocessor slows down the operations of the controls. However, for many applications such slowing down can be tolerated but when very fast response times are required, apparatus similar to that shown in FIG. 1 would be preferred.

What is claimed is:

1. The method of stopping a feedback-controlled stepping motor having a stator and a rotor wherein the drive of the stator field is leading the rotor by more than one step and the rotor is rotating with an angular velocity within a first range of values comprising decreasing the drive lead of the stator field from its slewing value to another value whereby the angular velocity of the rotor decreases below said first range, the drive lead being progressively changed as a function of the difference between a stepwise decreasing desired value of velocity and the actual velocity value sensing for the decrease of the angular velocity of the rotor to within a second range of values, and stopping the rotation of the stator filed when the angular velocity of the rotor is within said second range of values to stop the rotor.

2. The method of claim 1 wherein said decreasing drive lead step comprises a plurality of substeps wherein each substep includes comparing a representation of the instantaneous angular velocity of the rotor with a stored representation of a desired angular velocity of the rotor and changing said lead of the stator field with respect to the rotor field in accordance with the difference between the two representations.

3. The method of claim 2 wherein there is a predetermined time interval between an initial substep and the subsequent plurality of substeps.

4. In a system including a stepping motor driving a load and an encoder which emits one pulse per step of the motor and wherein the stepping motor is being stepped by rotationally stepping the stator field one step for each of said one pulses, said stator field leading the rotor by more than one such step, the method of stopping the rotor comprising decreasing the lead of the stator field with respect to the rotor, in response to said one pulses generating a representation of the instantaneous angular velocity of the rotor, and stopping the rotational stepping of the stator field when said representations to indicate said instantaneous angular velocity has decreased to within a given range of values.

5. The method of claim 4 wherein the sensing step is a plurality of substeps each comprising comparing the representation of the instantaneous angular velocity of the rotor with a stored representation of a desired angular velocity of the rotor and delaying the time of occurrence of the next stepping of the stator field with respect to the occurrence of a pulse emitted by the encoder in accordance with the difference between the two compared representations.

6. The method of claim 4 or 5 wherein the generation of a representation of the instantaneous angular velocity comprises generating timing pulses of predetermined frequency and counting the number of said pulses occurring between two successive pulses emitted by said encoder.

7. The method of claim 6 wherein the stored representations are numbers and said comparing step comprises substracting a number representing the stored representations from the counted number of timing pulses to generate a remainder number.

8. The method of claims 5 or 7 wherein said delaying step comprises generating timing pulses and counting a number of said timing pulses which are a function of the difference between the two compared representations.

9. The method of claim 7 wherein said delaying step comprises down-counting the remainder number by a series of timing pulses to a zero value.

10. The method of claims 4 or 5 wherein there is a predetermined time interval between the step of decreasing the lead of the stator field and the initiation of the sensing step.

11. The method of claim 6 wherein the sensing step further comprises sensing when the number of counted timing pulses is within a given range of values.

12. The method of controlling the movement of a two phase bifilar stepping motor combination which emits two feedback pulses for each step the motor is stepped in response to stepping pulses comprising the steps of feeding a first stepping pulse to the motor to initiate rotation, accelerating the rotation of the stepping motor by generating a stepping pulse for each of two successively adjacent feedback pulses, slewing the motor by applying one stepping pulse to the stator for every two feedback pulses, decelerating the motor by generating no stepping pulse for at least two adjacent feedback pulses, and stopping the motor when the rotational velocity thereof is below a given value by terminating the stepping pulses.

13. The method of claim 12 wherein the deceleration is further controlled by controlling the time when a stepping pulse is fed to the motor for each pair of feedback pulses after a time during which no stepping pulse was applied to the stator.

14. The method of claim 13 wherein the time is controlled as a function of the instantaneous angular velocity of the motor.

15. The method of stopping a feedback-controlled stepping motor having a stator and a rotor wherein the drive of the stator field is leading the rotor by more than one step and the rotor is rotating with an angular velocity within a first range of values comprising decreasing the drive lead of the stator field from its rotor, measuring the velocity of rotation of the rotor and stopping the motor by applying a braking stepping pulse at a time which is directly related to the measured velocity of the rotor.

16. The method of stopping at a given rotational position a feedback-controlled stepping motor having a rotatable stator magnetic field for driving a rotor wherein the drive of the stator field is leading the rotor by more than one step and the rotor is rotating with an angular velocity within a first range of values comprising decreasing the drive lead of the stator field from its rotor, measuring the velocity of rotation of the rotor, and when the velocity is within a given range stopping the stepping of the stator field, measuring quantities related to the instantaneous velocity of the rotor due to the oscillations of the rotor about the desired rotational position, rotationally displacing the stator magnetic field from the desired rotational position in a direction opposite to the direction of the oscillation, and thereafter returning the stator magnetic field to the desired stopping position.

* * * * *